United States Patent [19]

Arnold et al.

[11] 4,258,368

[45] Mar. 24, 1981

[54] SAFETY MEANS FOR PREVENTING THE AUTOMATIC RESTART OF A MOTOR

[75] Inventors: Harold D. Arnold; Edward A. Kitsch, both of St. Louis County, Mo.

[73] Assignee: Emerson Electric Co., St. Louis, Mo.

[21] Appl. No.: 24,908

[22] Filed: Mar. 29, 1979

[51] Int. Cl.³ ............................................. H02P 3/00
[52] U.S. Cl. .................................... 318/762; 318/459; 318/549; 361/22
[58] Field of Search .................... 318/549, 400, 345 D, 318/345 H, 345 CA, 782, 783, 459, 446; 361/28, 29, 22, 23, 194; 307/140, 252 B, 252 C

[56] References Cited

U.S. PATENT DOCUMENTS

| | | | |
|---|---|---|---|
| 2,382,983 | 8/1945 | Ellis | 318/782 |
| 3,268,768 | 8/1966 | Milligan et al. | 318/783 |
| 3,562,587 | 2/1971 | Forst | 318/283 |
| 3,761,794 | 9/1973 | Quinlisk, Jr. et al. | 361/23 |
| 3,763,377 | 10/1973 | Weston | 307/140 |
| 3,903,456 | 9/1975 | Schaefer | 361/28 |
| 4,121,140 | 10/1978 | Jones | 318/783 |
| 4,125,885 | 11/1978 | Lowther | 361/29 |

OTHER PUBLICATIONS

General Electric Seminar Application Informaton 671.1 p. 9 3/65.

Primary Examiner—David Smith, Jr.
Attorney, Agent, or Firm—Polster, Polster and Lucchesi

[57] ABSTRACT

A safety device for preventing the automatic restart of a motor upon restoration of power to the motor. This device, in its preferred embodiment, includes a thyristor switch, such as a triac, in one of the power leads to the motor which is triggered by energizaton of the motor. Upon deenergizaton of the motor, the thyristor switch switches to its non-conductive state thereby preventing automatic restarting of the motor upon restoration of the power. A selectively actuable, momentary run switch is provided to momentarily shunt out the thyristor switch so as to selectively permit the restart of the motor.

19 Claims, 9 Drawing Figures

U.S. Patent   Mar. 24, 1981   Sheet 1 of 2   4,258,368
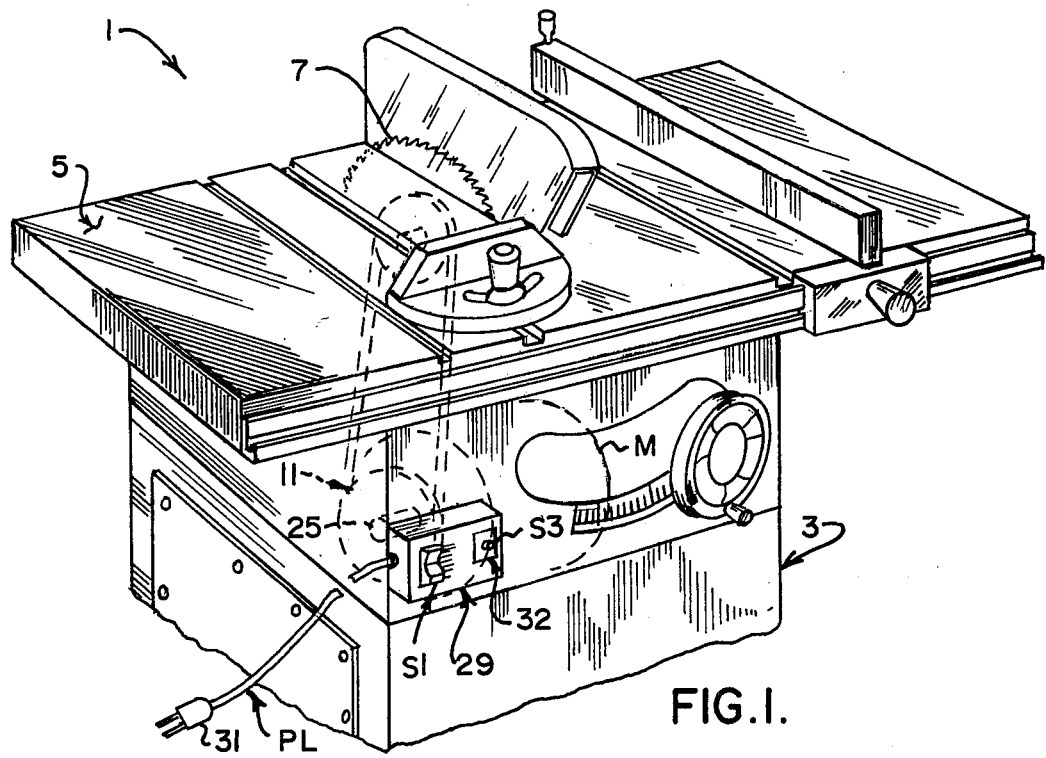
FIG.1.
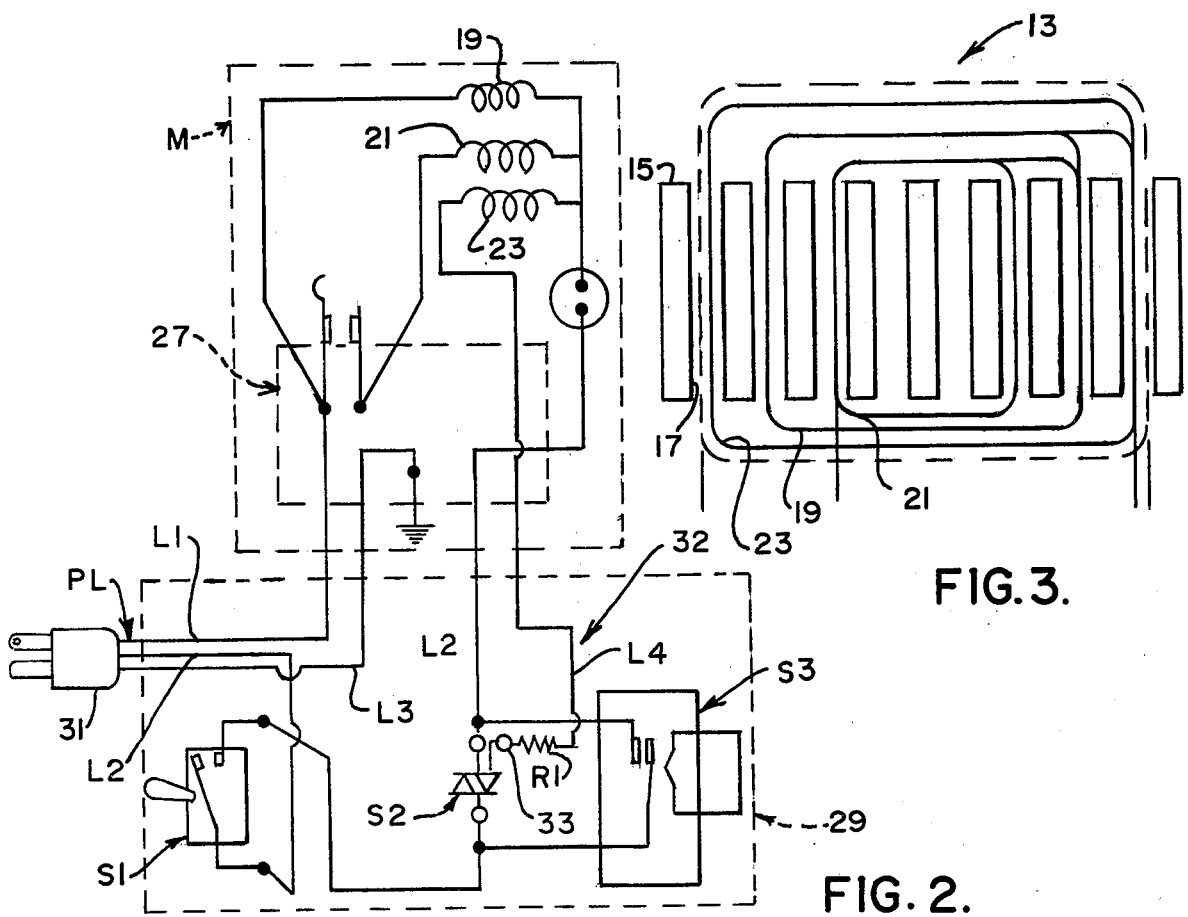
FIG.2.
FIG.3.

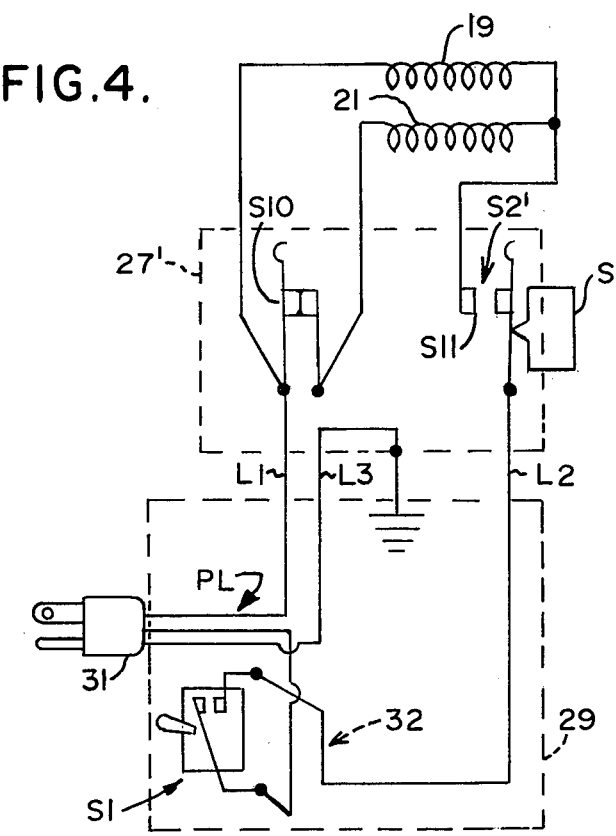
FIG.4.
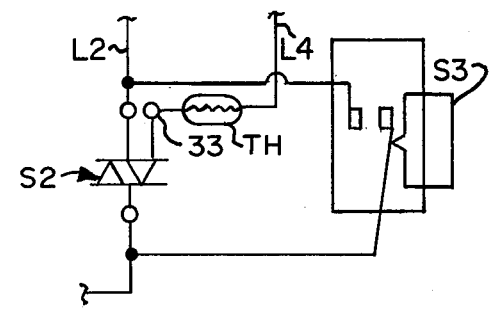
FIG.5.
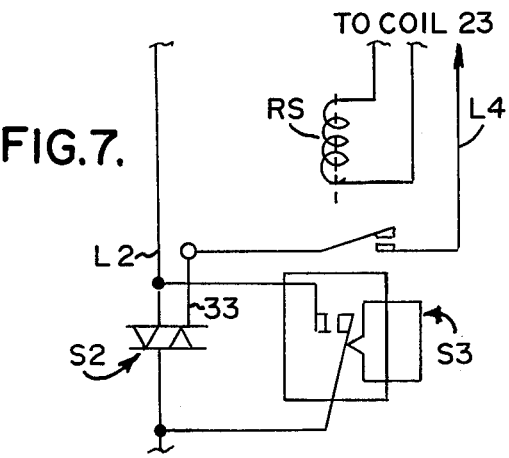
FIG.7.
FIG.6.
FIG.8.
FIG.9.

SAFETY MEANS FOR PREVENTING THE AUTOMATIC RESTART OF A MOTOR

BACKGROUND OF THE INVENTION

This invention relates to means for preventing the automatic restart of an electric motor, such as the drive motor for a power tool or other motor application, upon inadvertent deenergization of the motor thereby to reduce the danger of injury to the operator of the power tool or damage to the tool or to the work as may be caused by the unexpected restarting of the motor.

In certain motor applications, particularly in drive motors for power tools and the like, a danger to the operator or user of the power tool may be present if the tool would unexpectedly start up after an unintended stoppage of the tool. For example, in a table saw, the drive motor normally continues to operate once it has been energized until it is selectively shut down (i.e., it does not use a trigger switch which must be held open to energize the motor). However, in the event the power supply to the drive motor is inadvertently terminated and then is subsequently restored, the power tool may unexpectedly start up upon restoration of the power causing injury to the tool operator or damage to the tool or work piece. More specifically, if the power lead for the tool would inadvertently become unplugged from a wall socket or if the power to the building would be temporarily interrupted due to an outage, replugging the power lead into the wall socket or restoration of the power could restart the drive motor.

Reference may be made to U.S. Pat. No. 3,293,388 granted to J. L. Slonneger on Dec. 20, 1966 for certain background information relevant to the present invention.

SUMMARY OF THE INVENTION

Among the several objects and features of this invention may be noted the provision of safety means for use with an electric AC motor, such as a drive motor for a power tool or the like, which reliably prevents the automatic restart of the motor upon inadvertent deenergization of the motor and subsequent restoration of power to the motor thereby to prevent injury to the user of the power tool and to prevent damage to the power tool, or the work;

The provision of such safety means which may be readily incorporated in a variety of motor applications, such as in power tools and the like;

The provision of such safety means which may be readily reset or overridden to restart operation of the motor;

The provision of such safety means which is relatively simple and inexpensive to incorporate within a power tool or other electrical appliance;

The provision of a control for an electric motor incorporating safety means such as described above; and The provision of a power tool or motor incorporating a control with the above-discussed safety means incorporated therein.

Briefly, safety means of this invention for preventing the automatic restart of an electric AC motor upon the inadvertent interruption of power to the motor prevents possible injury or damage caused by the unexpected restart of the motor. The motor has a stator assembly which further includes a main stator winding. One or more power leads supply power to the motor. The safety means comprises a switch in one of the power leads for permitting the flow of current to the main stator winding when the switch is closed and for preventing the flow of current when the switch is open. Means connected in one of the power leads to the main stator winding passes current therethrough thereby enabling operation of the motor when this means is in an operating state and blocks the flow of current when the means is in an non-operating state thereby to prevent operation of the motor. This above-mentioned current passing and blocking means is in its operating state when the motor is in operation and is in its non-operating state when the motor is not in operation. A manual, momentarily operable switch is provided for permitting startup of the motor and to effect shifting of the current passing and blocking means from its non-operating to its operating state whereby upon the release of this momentary switch the motor remains in operation.

Other objects and features of this invention will be in part apparent and in part pointed out hereinafter.

BRIEF DESCRIPTION OF THE DRAWINGS

FIG. 1 is a perspective view of a power tool (i.e., a table saw) driven by an AC electric motor and having a control incorporating safety means of the present invention;

FIG. 2 is an electrical schematic of the above-noted motor and control incorporating a first embodiment of the safety means of the present invention which utilizes a thyristor switch as current passing and blocking means with the thyristor switch being energized by a voltage pickup coil incorporated in the windings of the motor;

FIG. 3 is a flat pattern, semi-diagrammatic view of a portion of the stator assembly of the electric AC motor illustrating a voltage pickup coil for effecting operation of the safety means of the present invention;

FIG. 4 is a schematic of an electro-mechanical embodiment of the safety means of the present invention;

FIG. 5 is a schematic of another embodiment of the safety means of the present invention generally similar to the electrical (or electronic) embodiment heretofore shown in FIG. 2 in which the thyristor switch is triggered by a thermistor energized by the voltage pickup coil;

FIG. 6 is a schematic of still another embodiment in which the thyristor switch is triggered by an optoelectronic device which in turn is energized by the voltage pickup coil;

FIG. 7 is a schematic of another embodiment of the safety means in which the thyristor switch is triggered by the opening and closing of a switch, such as a reed switch which in turn is operated by the voltage pickup coil;

FIG. 8 is a schematic of yet another embodiment of the safety means of the present invention in which the current passing and blocking means is a bimetal warp switch which is controlled (i.e., heated) by current from the voltage pickup coil; and FIG. 9 is a schematic of still another embodiment of the safety means in which the current passing and blocking means is a phototriac triggered by a light source energized by the voltage pickup coil.

Corresponding reference characters indicate corresponding parts throughout the several views of the drawings.

DESCRIPTION OF PREFERRED EMBODIMENTS

Referring now to the drawings and more particularly to FIG. 1, a power tool (or other AC electric motor application) is indicated in its entirety at 1. Power tool 1 is illustrated as a table saw having a cabinet base or frame 3 and a work supporting table 5. A rotary saw blade 7 is journalled in suitable bearings (not shown) in the cabinet base and a portion of the saw blade extends out through a blade slot in table 5. The saw blade is driven by a conventional AC split phase motor M via a drive belt and pulley arrangement, as indicated at 11. As is typical, motor M has a stator assembly 13 (see FIG. 3) including a stator core 15 made of a stack of lamination plates of suitable ferro-magnetic material having a central bore (not shown) for receiving a rotor assembly (also not shown) and a plurality of radial slots 17 extending outwardly from the bore. Coils of wire are placed in slot 17 to constitute main windings 19, auxiliary or starting windings 21, and a so-called voltage pickup coil 23. The rotor assembly is journalled within the motor so as to be concentrically positioned within the bore of the stator core, and it includes a rotor shaft 25 (see FIG. 1) extending endwise from a motor with the drive pulley for the pulley and belt arrangement 11 being fixed thereon and being rotatable therewith. The rotor assembly is caused to rotate a rotating magnetic field set up by main winding 19. However, with the rotor stopped, the rotating magnetic field in the main winding does not generate sufficient torque for startup of the motor. As is conventional with split-phase and capacitor-start AC motors, starting winding 21 is provided to temporarily generate the torque needed to accelerate the rotor to a predetermined speed (which may be, for example, about 80% of the synchronous speed of the motor) at which point the torque developed by the main windings alone is sufficient to operate the motor. Thus, motor M is typically provided with a so-called motor starting switch 27 actuable by a centrifugal actuator (not shown) responsive to the rotational speed of the motor to open the circuit to the starting winding once the motor has accelerated to its predetermined speed.

Operation of motor M is controlled by a control switch, as generally indicated at 29, located on power tool 1 in a position for ready access by the user of the tool. A grounded three connector power lead PL with a conventional male plug 31 on its free end is adapted to be plugged into a conventional wall outlet so as to supply power (e.g., 110 volts, single phase alternating current) to the power tool. Control 29 is shown (see FIGS. 2 and 4) to be wired to motor M by power input leads L1 and L2 (also referred to as load lines) and by a grounded lead L3. A toggle operated on/off switch S1 is provided in one of the power input leads, for example lead L2, for making or breaking an electrical circuit through main winding 19 and power input leads L1 and L2 so that when switch S1 is in its "on" position, (i.e., closed), the main winding will be connected to the power input lines.

In accordance with this invention, a safety device (also referred to as safety means), as generally indicated at 32, is incorporated in control switch 29 for preventing the automatic restart of motor M upon the making of on/off switch S1 or upon the inadvertent interruption and restoration of power to motor M thereby to prevent possible injury to the user of power tool 1 or to prevent possible damage to the power tool (or to the work) as may be occasioned by the unexpected restart of the motor. In FIGS. 2, 5-7 and 9, safety device 32 is shown to comprise a thyristor switch S2 connected in one of the input power leads, for example in lead L2, to motor M. In FIGS. 4 and 8, the safety device includes an electro-mechanical switch S2' connected in lead L2. Thyristor switch S2 has a gate junction 33 connected to voltage pickup coil 23 in motor M by a lead L4. Thyristor switch S2, when not triggered (as by a predetermined threshold voltage applied to its gate) is non-conducting (i.e., is in a non-operating state) and thus blocks the flow of current through lead L2. However, when it is triggered either by voltage pickup coil 23, the thyristor switch becomes conductive (i.e., is triggered) and allows current to flow through the power input lead L2. Thus, if on/off switch S1 is closed, energization of main winding 19 will be maintained so long as thyristor switch S2 remains triggered. This thyristor switch thus constitutes current passing and blocking means.

In FIG. 2, safety device 32 is shown to further comprise a normally open, manually actuated, momentary run switch S3 wired in lead L2 so as to be in parallel with thyristor switch S2 for shunting around the thyristor switch when switch S3 is momentarily closed.

In the embodiments shown in FIGS. 2, 5-7 and 9, thyristor switch S2 is preferably a bistable solid state device having three or more junctions with at least one of the junctions functioning as a gate. The term thyristor switch is herein defined in a generic sense to include silicon controlled rectifiers (SCR's), triacs, and other gate controlled electronic devices. In FIGS. 2, and 5-7, switch S2 is shown to be a triac constituted by a five layer npnpn bidirectional device with a common gate which provides switching action for either polarity of applied voltage and which can be controlled in either polarity by the single gate.

More specifically, in FIG. 2, the triac or thyristor switch S2 is shown to be triggered by the voltage output of coil 23. A resistor R1 in lead L4 is serially connected between gate junction 33 and pickup coil 23. For example, resistor R1 may have a resistance value of about 100 ohms for insuring that the proper voltage is provided to trigger thyristor switch S2.

The operation of the embodiment of the safety device shown in FIG. 2 will be now described. With plug 31 plugged into a suitable wall receptacle (not shown), motor M in power tool 1 may be energized by first closing on/off switch S1 and by momentarily, manually, closing run switch S3. The closing of on/off switch S1 connects main winding 19 of motor M to both sides of the power input leads L1 and L2, but triac switch S2 blocks the flow of current through power input lead L2. Thus, main winding 19 and starting winding 21 remain deenergized. Upon momentarily actuating (i.e. closing) run switch S3, triac switch S2 is shunted out of the circuit and current will flow through lead L2 to energize the main and starting windings of the motor. As soon as current begins to flow through main winding 19, a voltage signal will be induced or generated in voltage pickup coil 23 and applied to gate 33 of triac switch S2 by lead L4. Preferably, the turns of coils 23 are such that the voltage signal generated or induced in the voltage pickup coil is more than sufficient to trigger triac S2. For example, coil 23 may be so designed and wound in stator core 15 as to generate a stalled rotor voltage ranging from about 1.5 and 2.0 volts and a motor running voltage ranging between about 8 and 10 volts. Triac switch S2 can be selected so as to have a threshold trigger voltage greater than the stalled rotor voltage so that in the event the rotor of motor M stalls, the gate voltage in lead L4 will drop below the threshold voltage of the triac switch and the triac will switch to its unconducting state thus deenergizing the motor. However, in normal operation with the rotor free to rotate, the voltage induced in the voltage pickup coil will be more than sufficient to trigger the triac. Of course, it will be understood that the threshold trigger voltage of the triac may be such that the stalled rotor voltage induced in voltage pickup coil 23 is sufficient to trigger the triac. In any event, with the rotor free to rotate, release of the switch S3, the triggered triac will continue to pass current therethrough and the motor will remain energized.

With motor M in operation, inadvertent interruption of power, as may be occasioned by unplugging plug 31 from its wall socket or by a power outage, will cause the current passing and blocking means (thyristor switch S2) to switch to its non-operating or non-conducting mode so that upon restoration of power, the automatic startup of the motor is prevented. To restart the motor after an inadvertent power interruption, one must first ensure that on/off switch S1 is in its on or closed position. The user then selectively, manually actuates the momentary run switch S3 so as to shunt out thyristor switch or triac switch S2 thereby enabling the motor to restart. As mentioned above, the triac switch will be retriggered upon the restart of the motor and the triac switch will continue to operate in its conducting mode once momentary switch S3 is released and opens.

Referring now specifically to the embodiment of safety device 32 shown in FIG. 4, it will be noted that this is a so-called electro-mechanical device (as opposed to the electronic embodiment heretofore described in regard to FIG. 2), and that a voltage pickup coil is not required. Included within motor starting switch 27 is a first set of switch contacts S10 and a second set of switch contacts S11 constituting switch S2'. Contacts S10 are normally open and they control energization of auxiliary winding 21 in the motor. Contacts S11 are normally closed and constitute current passing and blocking means S2' similar to the thyristor switch S2 heretofore described. Both contact sets S10 and S11 are operated by the centrifugal actuator (not shown) included within the motor. As is conventional, the centrifugal actuator closes contacts S10 and permits contacts S11 to open upon stopping (or slowing) of the motor. With contacts S11 open, the main and auxiliary windings cannot be reenergized even if power is reapplied to leads L1 and L2. To permit restarting of the motor, a manually operable pushbutton reset switch actuator S3' (generally similar in function to reset switch S3 heretofore described in regard to the embodiment of FIG. 2) is provided. Upon actuation, switch S3' enables contacts S11 to be closed enabling the restart of the motor. As the motor accelerates to its operating speed, its centrifugal actuator moves to its run position holding contacts S11 closed. Then, momentary switch S3' may be released. The components of the embodiment shown in FIG. 4 having the same reference characters as shown in FIG. 2 have a similar function.

In FIG. 5, gate 33 of thyristor switch S2 is shown to be connected to a negative temperature coefficient thermistor TH series connected in lead L4 between gate 33 and voltage pickup coil 23. With the motor in operation and with coil 23 having a voltage generated therein, thermistor TH passes a current sufficient to trigger triac switch S2. Of course, upon deenergization of the motor, triac S2 switches to its blocking or non-operating state. Upon reenergization of the motor (i.e., upon re-application of power to leads L1 and L2), the triac will remain in its non-operating state. A momentary switch S3 is provided, as in the embodiment shown in FIG. 2, to momentarily shunt around the triac so as to restart the motor. Of course, once the motor has been restarted, coil 23 will generate sufficient voltage to trigger the triac.

In FIGS. 6, 7 and 9, the thermistor TH of the embodiment of FIG. 5 is shown to be respectively replaced by an optoelectronic device OE (e.g., a photocell) with the light source thereof energized by coil 23 (FIG. 6), by a magnetic reed switch RS energized by coil 23 (FIG. 7), and by a phototriac PT with the light source thereof energized by coil 23 (FIG. 9).

In FIG. 8, the current blocking and passing means S2' is shown to be a bimetal warp switch B actuated by a heater H affixed thereto and energized by coil 23. Of course, a shunting switch (not shown) generally similar to the reset switches S3 heretofore described may be used to shunt around switch B and to permit re-starting of the motor.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

We claim:

1. Safety means for preventing the automatic restart of an AC electric motor upon the inadvertent interruption of power to the motor thereby to prevent possible injury or damage caused by the unexpected restart of the motor, said motor having a stator, a main stator winding, and power leads for supplying power to said motor, said safety means comprising means connected in one of the power leads to said main stator winding for passing current therethrough thereby enabling operation of said motor when in an operating state and for blocking the flow of current when in a non-operating state thereby preventing operation of said motor, said current passing and blocking means being in its operating state when said motor is in operation and being in its non-operating state when said motor is not in operation, a voltage pickup coil is included in the stator of said motor in which a voltage is induced upon energization of the motor for supplying a voltage output signal, and manual, momentarily operable switch means for permitting the flow of current to said motor so as to permit startup of said motor and to effect shifting of said current passing and blocking means from its non-operating to its operating state upon release of said momentary switch means and upon said motor remaining in operation, said current passing and blocking means being triggered by said voltage output signal of said voltage pickup coil so as to be in its operating state when it is supplied with said voltage output signal and to be in its non-operating state when it is not supplied with said signal.

2. Safety means as set forth in claim 1 wherein said current passing and blocking means is a solid state thyristor switch having a gate, said voltage pickup coil being connected to said gate so as to supply said voltage output signal thereto, said signal being of sufficient magnitude so as to trigger said thyristor switch into its operating or conducting state, and wherein said momentary switch means when closed enables the flow of current around said thyristor switch thereby to permit energization of the motor and to permit the voltage pickup coil to generate said signal and to trigger said thyristor switch.

3. Safety means as set forth in claim 2 wherein said thyristor switch is a bidirectional triode AC switch.

4. Safety means as set forth in claim 2 wherein said thyristor switch is a triac.

5. Safety means as set forth in claim 1 wherein said current passing and blocking means is a normally open switch which is permitted to open upon the stopping of said motor, and wherein said normally open switch may be selectively manually closed so as to permit the restarting of said motor.

6. Safety means as set forth in claim 1 wherein said current passing and blocking means is a normally open bimetal warp switch in one of the power leads to said main stator winding, said bimetal warp switch having a heater associated therewith which when energized heats said bimetal warp switch and closes it, said heater being energized by said voltage pickup coil, said safety means further comprising selectively operable means for shunting around said bimetal warp switch to permit energization of said motor.

7. Safety means for preventing the automatic restart of an AC electric motor upon the inadvertent interruption of power to the motor thereby to prevent possible injury or damage caused by the unexpected restart of the motor, said motor having a stator, a main stator winding, and one or more power leads for supplying power to said main stator winding, said safety means comprising a voltage pickup coil provided in the stator of said motor in which a voltage is induced upon energization of said motor for supplying a voltage output signal, a switch in one of said power leads for the flow of current to said main stator winding when said switch is closed and for preventing the flow of current when said switch is open, means connected in one of the power leads to said main stator winding for passing current therethrough thereby enabling operation of said motor when in an operating state and for blocking the flow of current when in a non-operating state thereby preventing operation of said motor, said current passing and blocking means being triggered by said voltage output signal of said voltage pickup coil so as to be in its operating state when it is supplied with said voltage output signal and so as to be in its non-operating state when it is not supplied with said voltage output signal, and switch means for permitting the flow of current around said current passing and blocking means when closed thereby to permit energization of the main stator winding and to permit said voltage pickup coil to generate said signal and to trigger said current passing and blocking means.

8. Safety means as set forth in claim 7 wherein said current passing and blocking means is triggered by said voltage output signal of said voltage pickup coil so as to be in its operating state when it is supplied with said voltage output signal and to be in its non-operating state when it is not supplied with said signal.

9. Safety means as set forth in claim 8 wherein said thyristor switch is a bidirectional triode AC switch.

10. Safety means as set forth in claim 8 wherein said thyristor switch is a triac.

11. Safety means as set forth in claim 7 wherein said switch means comprises a manually actuable, momentarily closeable switch for shunting said current passing and blocking means from its said power lead thereby to permit energization of said main stator winding and to permit said voltage pickup coil to generate said voltage output signal and to trigger said current passing and blocking means so that upon opening of said momentary, switch said current passing and blocking means maintains energization of said main stator winding and enables continued operation of said motor.

12. An AC motor having safety means for preventing automatic reenergization of the motor upon inadvertent deenergization of the motor as may be occasioned by the inadvertent interruption of the supply of power to the motor, said motor having a stator including a main winding, power leads for energization of said main winding, and an on/off switch for making and breaking connection of said main winding to a supply of power, said safety means comprising a triac connected in one of said power leads, a voltage pickup coil disposed in said stator for having a trigger voltage induced therein upon energization of said main winding, said triac having a gate connected to said voltage pickup coil and being triggered from an unconducting state to a conducting state upon application of said trigger voltage to said gate, and momentary switch means connected in parallel with said triac in said one power leads for selectively permitting energization of said main winding when said triac is in its unconducting state and for enabling said pickup voltage coil to generate said trigger signal so that upon the release of said momentary switch, said triac will be triggered into its conducting state thus enabling continued operation of said motor.

13. A control system for an AC electric motor with safety means for preventing inadvertent reenergization of the motor, said motor having a stator including a main winding and a voltage pickup coil in which a voltage signal is induced in response to energization of said main winding, said control system including at least two input power leads adapted to be connected to said main winding for energization thereof, an on/off switch adapted to make and break the connection of one of said power leads to said main winding, means connected in series in one of said power leads for passing current therethrough when in an operating state and for blocking the flow of current therethrough when in a non-operating state, said current passing and blocking means being responsive to said voltage signal induced in said voltage pickup coil and being triggered into its operating state so long as said voltage signal is induced and being further responsive to said voltage signal dropping below a threshold value as may be occasioned by the inadvertent interruption of power to said motor or by stoppage of the motor thereby to switch said current passing and blocking means to its non-conducting state so as to prevent the unexpected automatic restart of the motor upon restoration of power, said safety means further comprising a manually actuated, momentarily closed switch connected in parallel in said one power lead with said current passing and blocking means which when closed shunts around the last-said means and enables energization of said main winding and restart of the motor.

14. A control system as set forth in claim 13 wherein said current passing and blocking means is a solid state thyristor switch having a gate, said output voltage signal being connected to said gate and being sufficient to trigger said thyristor switch into its operating or conducting state.

15. A control system as set forth in claim 14 wherein said thyristor switch is a bidirectional triode AC switch.

16. In a power tool or the like having an electric AC drive motor and a controller for controlling operation of said motor, the latter having a stator assembly including a main winding and a voltage pickup coil, said voltage pickup coil having a voltage output signal induced therein upon energization of said main winding, said controller being adapted to be connected to the power leads for said motor and including an on/off switch in one of said power leads, wherein the improvement comprises safety means in one of said power leads for preventing the automatic restart of the motor upon inadvertent interruption of the supply of power to the motor, said safety means comprising a thyristor switch connected in one of the power leads to the motor, said thyristor switch having a gate connected to said voltage pickup coil and being triggered by said voltage output signal so as to pass current therethrough and to permit continued energization of said motor and being inoperative thereby to prevent energization of said motor upon even momentary interruption of said voltage output signal as may be occasioned by the inadvertent interruption of power supplied to said motor, and switch means around said thyristor switch selectively operable to shunt said thyristor switch and to permit energization of said motor and being further operable so as to connect said thyristor switch into its said power lead once said motor has been reenergized and once said voltage pickup coil is again generating said voltage output signal whereby said signal will trigger and maintain said thyristor switch and the latter will continue to enable energization of said motor.

17. Safety means for preventing the automatic re-start of an electric motor upon the unintended interruption of power thereto so as to prevent possible injury or damage upon the unexpected restart of the motor, said motor comprising a stator assembly including a main winding and means in which a signal is induced upon energization of said main winding, and one or more power leads for supplying electrical power to said main winding, said safety means comprising an on/off switch in one of said power leads which when open blocks the flow of current to said main winding and which when closed permits energization of said main winding, current passing and blocking means in one of said power leads responsive to said signal from said signal means for passing current therethrough thus permitting energization of said main winding and responsive to the termination of said signal as may be occasioned by the inadvertent interruption of power to the motor causing the deenergization of said main winding for blocking the flow of current therethrough and for preventing the automatic restarting of the motor upon restoration of said power, and manually actuable, momentary by-pass means around said current blocking and passing means which when selectively actuated permits the flow of current around said current passing and blocking means thereby to enable the selected restart of said motor and the generation of said signal by said signal means so that upon the release of said by-pass means said current passing and blocking means will be triggered by said signal for continued operation of said motor.

18. Safety means as set forth in claim 17 wherein said current blocking and passing means comprises a thyristor switch having a gate junction, the latter being connected to said signal means whereby said signal is applied to said gate junction, said thyristor switch being responsive to a predetermined threshold trigger voltage, for being switched from its current blocking its current passing mode.

19. Safety means as set forth in claim 17 wherein said signal means is a voltage pickup coil in said stator, said voltage pickup coil generating a voltage signal in excess of said threshold trigger voltage when the rotor of said motor is free to rotate and another voltage signal when the rotor is blocked less than said threshold trigger voltage whereby said motor will automatically be deenergized upon blockage of said rotor.

* * * * *